(12) United States Patent
Kim

(10) Patent No.: US 6,416,417 B1
(45) Date of Patent: Jul. 9, 2002

(54) DUAL MASS VIBRATION DAMPING FLYWHEEL FOR VEHICLES

(76) Inventor: Hyunsik Kim, 1074 Hwang Sung-Dong, Kyongju (KR)

( * ) Notice: Subject to any disclaimer, the term of this patent is extended or adjusted under 35 U.S.C. 154(b) by 45 days.

(21) Appl. No.: 09/696,247

(22) Filed: Oct. 26, 2000

(30) Foreign Application Priority Data

Mar. 16, 2000 (KR) ......................................... 2000-13337

(51) Int. Cl.[7] ................................................ F16D 3/12
(52) U.S. Cl. ...................... 464/66; 464/68; 192/70.17; 192/203; 192/212
(58) Field of Search ............................. 464/61, 62, 63, 464/64, 65, 67, 68; 192/70.17, 55.61, 203, 212

(56) References Cited

U.S. PATENT DOCUMENTS

| | | | | |
|---|---|---|---|---|
| 1,933,436 A | * | 10/1933 | Kalmar | 464/17 |
| 2,895,316 A | * | 7/1959 | Kloud | 464/66 |
| 4,139,995 A | * | 2/1979 | Lamarche | 464/66 |
| 4,148,200 A | * | 4/1979 | Schallhorn et al. | 464/66 |
| 4,188,806 A | * | 2/1980 | Fall et al. | 192/106.1 |
| 4,555,008 A | * | 11/1985 | Nagano | 464/26 |
| 5,380,248 A | * | 1/1995 | Kraus et al. | 464/66 |
| 5,823,880 A | * | 10/1998 | Kajitani et al. | 464/66 |
| 5,848,938 A | * | 12/1998 | Curtis et al. | 464/66 |
| 5,863,253 A | * | 1/1999 | Rohe et al. | 464/66 |

* cited by examiner

Primary Examiner—Lynne H. Browne
Assistant Examiner—Kenn Thompson

(57) ABSTRACT

A dual mass vibration damping flywheel includes a primary mass flywheel and a secondary mass flywheel connected to the primary mass flywheel. A drive plate having a characteristic shape is positioned between the primary mass flywheel and the secondary mass flywheel, the drive plate being rotated in response to rotation of the primary mass flywheel. A spring assembly is provided having a roller member at one end thereof, the roller member being in contact with the characteristic shape of the drive plate and compressing the spring assembly upon rotation of the drive plate. The drive plate is formed as an axe shape such that the roller of the spring assembly rolls in contact with the characteristic shape of the drive plate upon rotation of the drive plate and the primary mass flywheel. The effect of the spring assembly and roller against the characteristic shape of the drive plate is to dampen the vibration of the dual mass flywheel.

10 Claims, 5 Drawing Sheets

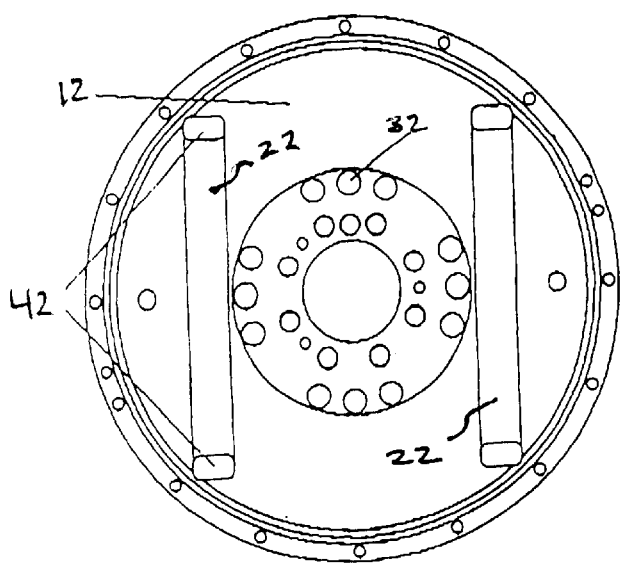 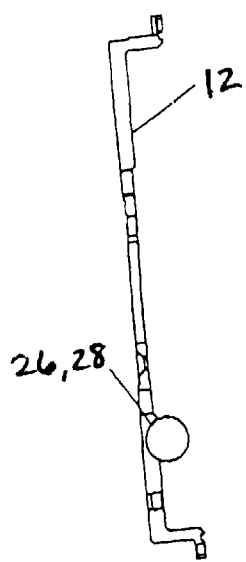
FIG. 5a     FIG. 5b
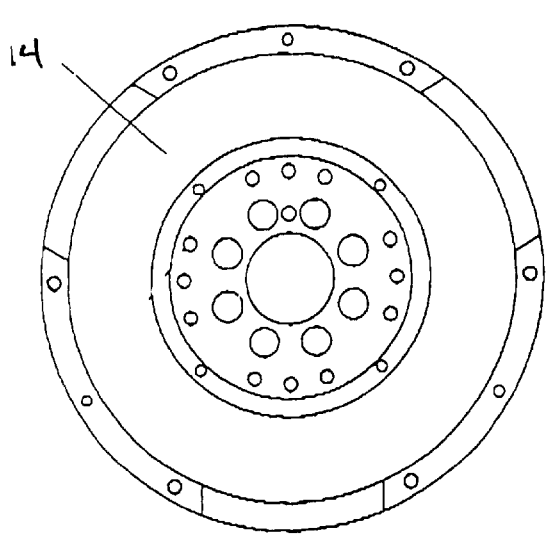 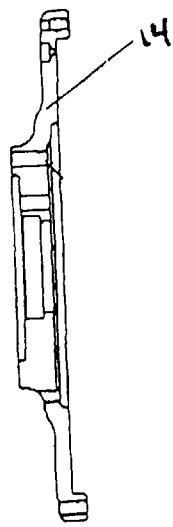
FIG. 6a     FIG. 6b

DUAL MASS VIBRATION DAMPING FLYWHEEL FOR VEHICLES

BACKGROUND OF THE INVENTION

1. Field of the Invention

The present invention relates to the improvement of a device for absorbing the torsional vibration from a drive train of a vehicle.

More specifically, the present invention is directed to a compression spring assembly, having a roller member thereon, in combination with a drive plate in which the compression spring assembly and roller member interact with the drive plate to absorb torsional vibration from the drive train of a vehicle. A rolling friction damping device is thus achieved in which an optimum hysteresis for a damping effect is obtained.

2. Description of Related Art

Generally, in an engine, the expansion stroke is only an output stroke and a suction stroke. A compression stroke and an exhaust stroke are output stroke reduced. In an expansion stroke, a turning effect of a drive plate is increased and/or decreased, so an engine speed varies periodically. The known flywheel is manufactured in order to prevent the above mentioned periodic variance factor of the engine speed.

Namely, the inertial force of the conventional flywheel is used to change the fluctuating rotating force of the drive plate.

The present invention utilizes the effects of the drive plate and provides and/or utilizes the characteristic shape thereof in the present invention. Specifically, when turning a damper of a dual mass vibration damping flywheel for vehicles, the optimum vibration damping effect can be achieved by realizing a hysteresis thereof. It is the inventors' discovery that an ideal torque curve was needed to achieve the shock absorbing effect of the dual mass flywheel. This can be obtained by controlling a drive plate's function in accordance with the engine characteristic and/or traveling condition of the vehicle.

Accordingly, it is an object of the invention to provide a dual mass flywheel which absorbs torsional vibration from a drive train of a vehicle.

It is another object of the invention to provide a dual mass flywheel in which a drive plate thereof has a characteristic shape.

It is yet another object of the invention to provide a dual mass flywheel in which the characteristic shape of the drive plate interacts with a compression spring assembly.

It is still another object of the invention to provide a dual mass flywheel in which the compression spring assembly includes a roller on at least one end thereof, the roller following the characteristic shape of the drive plate.

It is a further object of the invention to provide a dual mass flywheel for absorbing torsional vibration from a drive train of a vehicle which is easy to manufacture and simple to use.

These and other objects of the invention are achieved by providing a dual mass vibration damping flywheel including a primary mass flywheel and a secondary mass flywheel connected to the primary mass flywheel. A drive plate having a characteristic shape is positioned between the primary mass flywheel and the secondary mass flywheel, the drive plate being rotated in response to rotation of the primary mass flywheel. A spring assembly is provided having a roller member at one end thereof, the roller member being in contact with the characteristic shape of the drive plate and compressing the spring assembly upon rotation of the drive plate. The drive plate is formed as an axe shape such that the roller of the spring assembly rolls in contact with the characteristic shape of the drive plate upon rotation of the drive plate and the primary mass flywheel. The effect of the spring assembly and roller against the characteristic shape of the drive plate is to dampen the vibration of the dual mass flywheel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5a is a front view of a primary mass of the dual mass flywheel according to the present invention;

FIG. 5b is a side sectional view of the primary mass of the dual mass flywheel according to the present invention;

FIG. 6a is a front view of a secondary mass of the dual mass flywheel;

FIG. 6b is a side sectional view of the secondary mass of the dual mass flywheel according to the present invention;

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Figure 1:
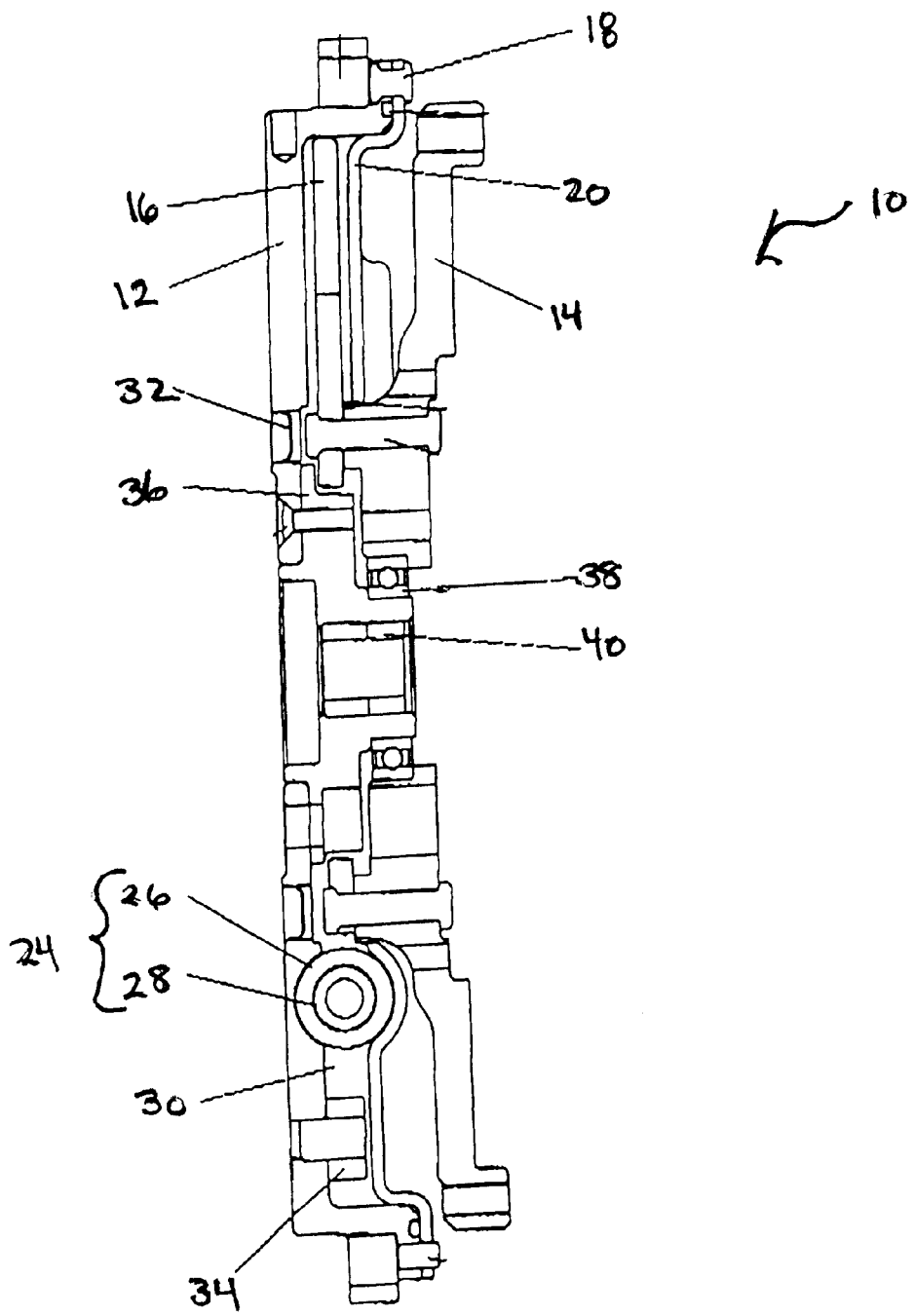
FIG. 1 is a partial side elevation of a dual mass flywheel according to the present invention.

Referring first to FIG. 1, there is shown a partial side view of the dual mass flywheel 10 according to the present invention.

The general construction of a dual mass flywheel is understood to be known in the art. Accordingly, those features which are considered to be novel and incorporating the novel features of the present invention will be those which are explained in more detail.

The dual mass flywheel 10 includes a primary mass 12 and a secondary mass 14 as shown. The primary mass 12 and secondary mass 14 are each positioned on opposing sides of a drive plate 16. At least one rivet 18 is used to make the connection of the primary mass 12 and secondary mass 14 with the drive plate 16, however, any suitable connection may be made as known in the art.

A cover 20 is formed to surround the primary mass 12, and in doing so forms a spring seat or housing 22. The spring seat 22 is substantially cylindrical shaped to correspond to the particular shape of spring utilized in the present invention, but the shape thereof is not limited to a cylindrical shape.

The spring assembly 24 of the present invention includes a main spring 26 and a sub spring 28 installed longitudinally interior of the main spring 26. The primary mass 12 and cover 20 are secured by the rivet 18 as indicated and the formed spring seat or housing 22 is filled with a lubricant 30 such as grease or the like and then sealed with a cap 32.

An inner surface of the primary mass 12 may be mounted against a torque limiter 34, such that the torque limiter 34 can be worked to achieve a maximum compression of the spring assembly 24 in order to divide an elastic load of the spring assembly 24.

Each of a hub plate 36, a ball bearing 38 and a needle bearing 40 will not be explained in any detail as the functions thereof are well known.

Figure 4A:
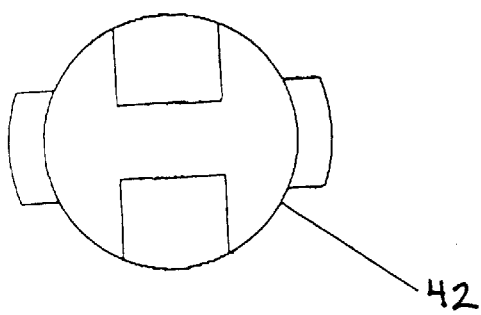
FIG. 4a is a top plan view of the roller of the present invention.
Figure 4B:
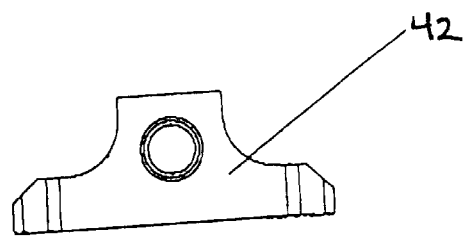
FIG. 4b is a side view of the roller of the present invention.

A roller member 42 is shown in detail in FIGS. 4a and 4b. The roller member 42 is mounted to the end of the spring assembly 24 and is in surface engagement with the drive plate 16 as described in the following.

The working principal of the invention is such that if a torque fluctuation of the engine is produced, a turning effect of the primary mass 12 is increased so that the relative rotation motion of drive plate 16 may occur. Therefore as the roller member 42 rolls against the drive plate 16, the drive plate 16 compresses the spring assembly 24 by the relative motion of the springs 26, 28. The compressibility point at which the drive plate 16 compresses the springs 26, 28 may change, and the roller member 42 rolls over the surface of the drive plate 16 to accommodate this change. As the drive plate 16 rotates, the compressibility volume may change. If the geometry of the drive plate 16 changes, the turning angle is maintained but the torque accumulated in the springs 26, 28 is different.

Figure 2:
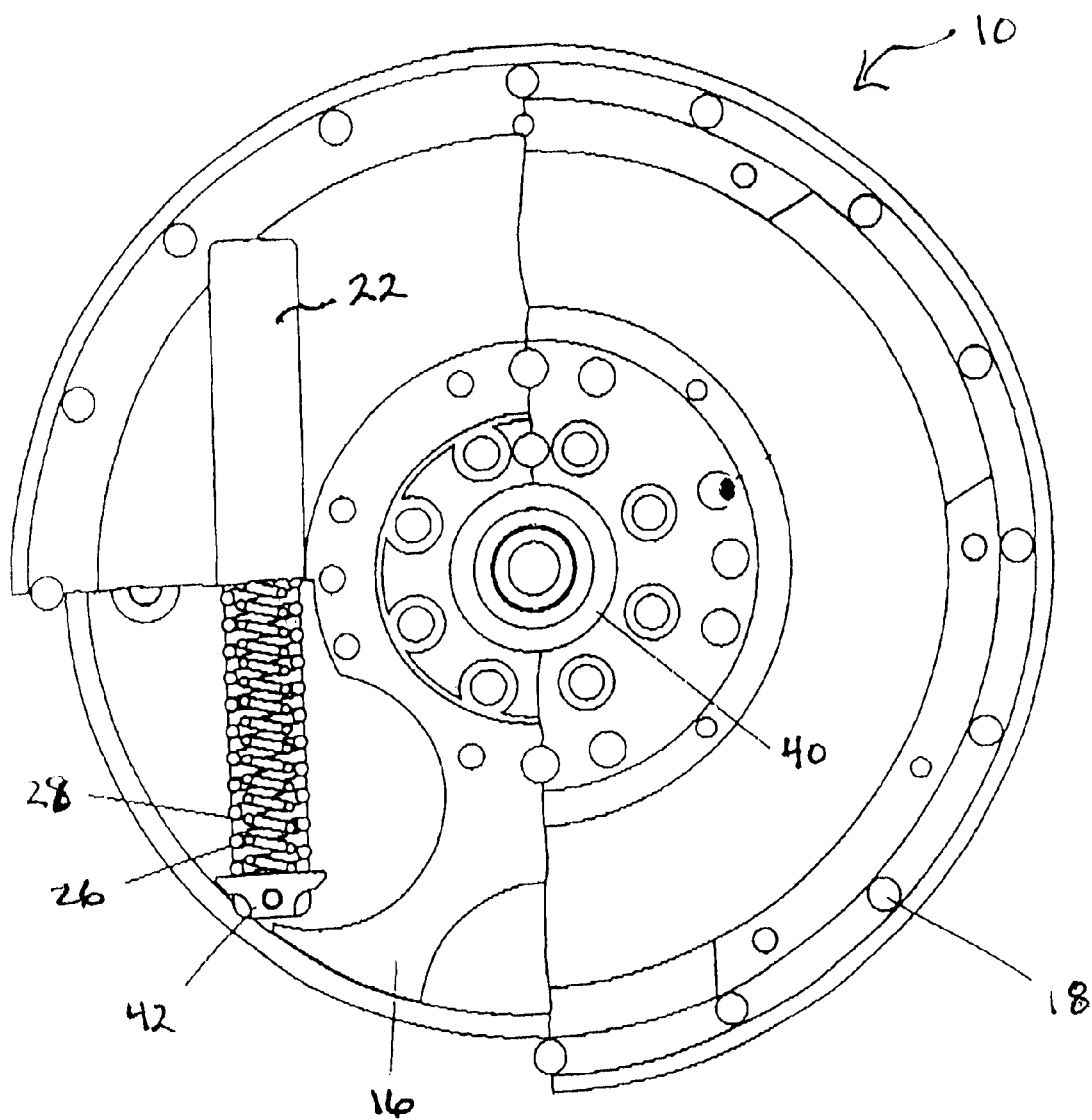
FIG. 2 is front and partial breakaway view of an assembled dual mass flywheel according to the present invention.

FIG. 2 show an assembly drawing of the dual mass flywheel according to the present invention.

The roller member 42 is supported by the compression coil spring assembly 24, such that the main spring 24 and sub spring 26 are located at the end of an arcuate curvature 44 of the drive plate 16.

Figure 3:
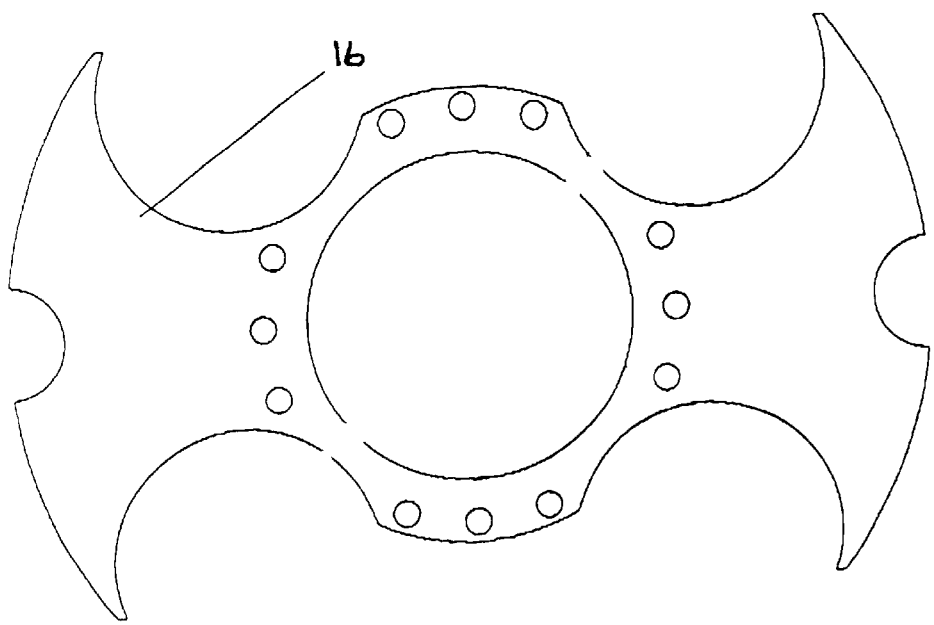
FIG. 3 is a drive plate of the dual mass flywheel according to the present invention.

FIG. 3 shows the drive plate of the dual mass flywheel according to the present invention. The end of the drive plate 16 is supported by the roller member 42 with a rivet/rivet hole 46 connected to the secondary mass 14 which is fastened to the outside of the hub plate 36 by the ball bearings 38.

The geometry of the drive plate 16 is made in accordance with an engine characteristic. It is possible that an optimum torque may be obtained. The present invention designs the arc shape 44 of the drive plate 16 but it is possible that alternative or other shapes may be designed which are suitable. All other such suitable shapes of the drive plate 16 are intended to be included within the scope of the invention.

FIG. 4 shows the roller member 42 of the present invention in more detail. The roller member 42 may be mounted over the compression coil spring assembly 24, including the main spring 26 and the sub compression coil spring 28.

The cover 20 wraps the drive plate 16 and the inertial drive plate 16 is seated with the main spring 26 and the sub coiled spring 28 that form the compression coil spring assembly 24.

FIGS. 5a and 5b show the primary mass of the dual mass flywheel. Either side of the primary mass may be mounted to a compression coil spring assembly 24. The primary mass 12 may wrap the drive plate 12 in conjunction with the cover 20, and the inertial drive plate 16 seats with the main spring 26 and the sub coil spring 28 that form the compression coil spring assembly 24.

FIGS. 6a and 6b show a secondary mass sectional view of the dual mass flywheel.

Figure 7:
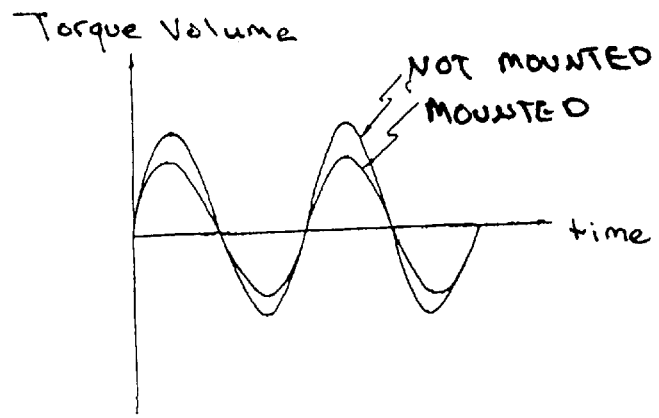
FIG. 7 is the variation of transmission input shaft angular acceleration when a dual mass flywheel is mounted and it is not mounted.

FIG. 7 illustrates the variation of transmission input shaft angular acceleration graph varied when a dual mass flywheel is mounted (line 50) and when a dual mass flywheel is not mounted (line 52). The torque volume is the transmission input shaft angular acceleration.

The vibration damping of the flywheel object is known as the graph showing the torque fluctuation when the prior flywheel is mounted and the dual mass flywheel is mounted in course of time. If the dual mass flywheel is mounted, the torque vibration is reduced much more.

Figure 8:
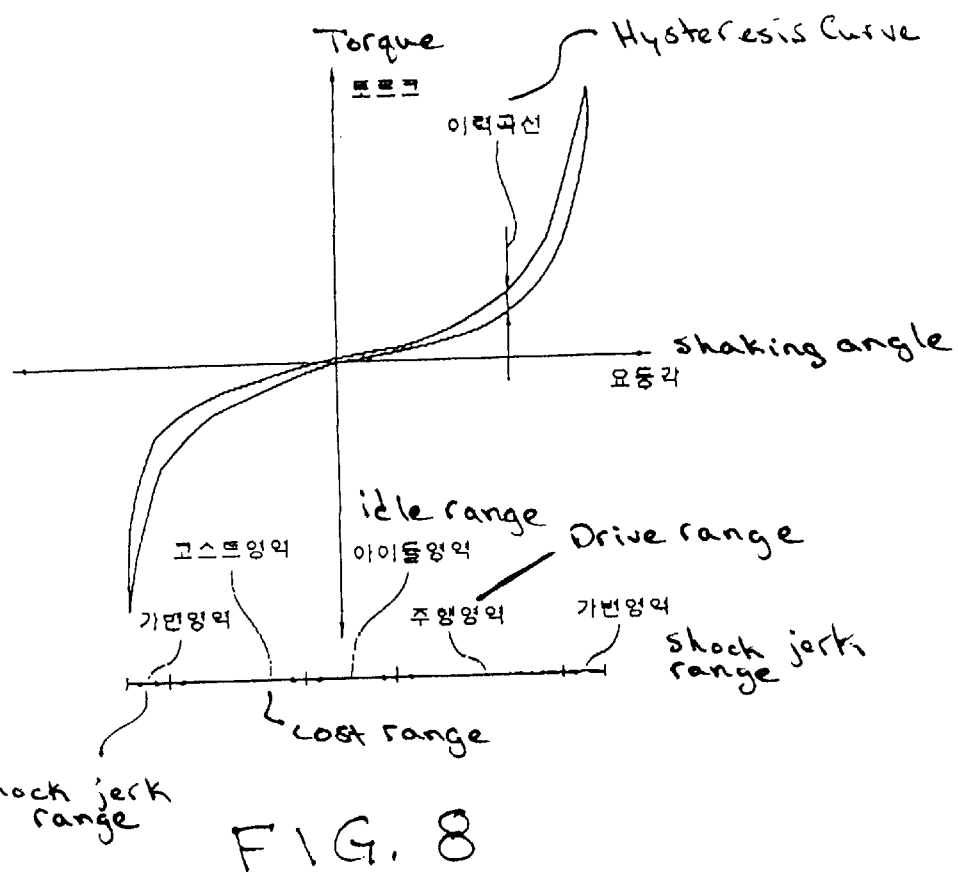
FIG. 8 is an optimum hysteresis to be able to be realized by means of the dual mass flywheel according to the present invention.

FIG. 8 illustrates a hysteresis which is realized by means of the dual mass flywheel according to the present invention. Specifically, as the shaking angle increases, the torque volume may change the inclination of three grades, including an idle field, a traveling field, and a load change field. The hysteresis may be changeably made in accordance with the size and the geometry of the drive plate 16. The prior hysteresis of the traveling field is a soft curve.

Accordingly, the present invention relates to a dual mass vibration damping flywheel which is able to play an important role in damping by the design of a rolling friction damping device. This invention includes a compression coiled spring assembly, a roller, and a drive plate that are in combination able to control a torque curve in accordance with an engine characteristic and/or a traveling condition and to rotate by means of the roller 42 provided in connection therewith.

Therefore, when turning a damper of a dual mass vibration damping flywheel for vehicles, the optimum vibration damping effect can be achieved by easily realizing an optimum hysterisis. Moreover, the production cost can be reduced by simplifying the needed parts of the flywheel that is used to make the optimum vibration damping effect.

The compression coil spring is constructed of an elasticity member, and the inertial dual-compression coil spring assembly is filled with a lubricant such as grease in order to prevent wear of the spring assembly.

Accordingly, there is the roller and guide enabling compression of the spring assembly by means of rotation of the drive plate, and the drive plate and dual mass flywheels are connected together with a rivet. The drive plate can relatively rotate with respect to the primary mass in order to fully realize the torque shock reduction of the engine and the torsional vibration damping of the engine to the drive train of the vehicle that are objects of the dual mass flywheel. Also, the compression coil spring assembly is supported through the spring guide so that durability, strength, and buckling prevention of the spring can be achieved.

It is possible to easily realize the torque curve of the dual mass flywheel as the geometry of the drive plate and it is also possible to control the damping of the hysteresis according to a working surface roughness against the roller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dual mass vibration damping flywheel, comprising:
   a primary mass flywheel;
   a secondary mass flywheel connected to said primary mass flywheel;
   a drive plate having a characteristic shape and positioned between said primary mass flywheel and said secondary mass flywheel, said drive plate being rotated in response to rotation of said primary mass flywheel;
   a spring assembly having a roller member at one end thereof, said roller member being in contact with the characteristic shape of said drive plate and compressing said spring assembly upon rotation of said drive plate controlling freely the torque characteristic curve of spring as being controlled a circle or arc shape.

2. The dual mass flywheel according to claim 1, wherein said drive plate is formed as a dual-winged shape.

3. The dual mass flywheel according to claim 1, wherein said drive plate is formed as an arc shape.

4. The dual mass flywheel according to claim 1, wherein said spring assembly includes a main spring and a sub-spring longitudinally housed within said main spring.

5. The dual mass flywheel according to claim 1, wherein said roller includes at least one roller positioned at an end of said spring assembly so as to contact with the characteristic shape of said drive plate.

6. The dual mass flywheel according to claim 1, further comprising a guide housing for said spring assembly, said guide housing preventing said spring assembly from distorting during compressions thereof.

7. The dual mass flywheel according to claim 6, further comprising a lubricant inserted into said guide housing, said lubricant imparting a damping effect by providing friction between said guide housing and said spring assembly.

8. The dual mass flywheel according to claim 1, wherein said drive plate opposes a torque shock of an engine in order to rotate smoothly by the soft quality torque limiter.

9. The dual mass flywheel according to claim 1, wherein a hysteresis of said dual mass flywheel is controlled by controlling a working roughness of said drive plate, and contact of said roller with the characteristic shape of said drive plate.

10. A dual mass vibration damping flywheel comprising:
    a primary mass flywheel mounted at an outside of a hub plate where the hub plate is connected to an engine crankshaft;
    a drive plate having a rivet head and a crankshaft, said drive plate positioned on an opposing side of a primary mass and mounted at the outside of the hub plate;
    a cover formed to surround the primary mass and riveted to with said primary mass;
    a main spring and sub spring mounted at a spring seat formed between the primary mass and the cover to achieve durability, strength and bucking prevention;
    a roller mounted to an end of the spring assembly, said roller trolling over the surface of the drive plate;
    a secondary mass connected to the drive plate with a rivet/rivet hole and fastened to the outside of the hub plate by the ball bearings; and
    a spring guide supporting said main spring and subspring to provide a dual mass flywheel for absorbing torsional vibration from a drive train of a vehicle.

* * * * *